United States Patent [19]
Dumont et al.

[11] Patent Number: 5,463,706
[45] Date of Patent: Oct. 31, 1995

[54] LIGHT TRACEABLE TRANSMISSION CONDUIT ASSEMBLY

[75] Inventors: Kenneth R. Dumont, Collierville; Andrew J. O'Neill, Cordova; Scott T. Davies, Germantown, all of Tenn.

[73] Assignee: Thomas & Betts Corporation, Memphis, Tenn.

[21] Appl. No.: 197,026

[22] Filed: Feb. 16, 1994

[51] Int. Cl.⁶ ........................................ G02B 6/26
[52] U.S. Cl. ..................... 385/32; 385/127; 385/901
[58] Field of Search ............... 385/31, 32, 123–128, 385/147, 901; 362/32

[56] References Cited

U.S. PATENT DOCUMENTS

| | | | |
|---|---|---|---|
| Re. 32,436 | 6/1987 | Hartig | 385/108 |
| 2,539,828 | 1/1951 | Goldis et al. | 362/32 |
| 2,699,770 | 1/1955 | Fourestier et al. | 128/6 |
| 2,843,112 | 7/1958 | Miller | 128/6 |
| 3,497,981 | 3/1970 | Tyne | 385/901 X |
| 3,664,330 | 5/1972 | Deutsch | 128/18 |
| 4,070,091 | 1/1978 | Taylor et al. | 385/124 X |
| 4,149,770 | 4/1979 | Milton et al. | 385/47 |
| 4,169,657 | 10/1979 | Bedard | 385/108 |
| 4,422,719 | 12/1983 | Orcutt | 385/123 |
| 4,466,697 | 8/1984 | Daniel | 385/128 X |
| 4,717,229 | 1/1988 | Cutler | 385/31 |
| 5,011,260 | 4/1991 | Marx et al. | 385/100 |
| 5,039,188 | 8/1991 | Williams | 385/32 |
| 5,074,643 | 12/1991 | Petisce | 385/128 |
| 5,187,770 | 2/1993 | Mishima et al. | 385/145 |
| 5,260,566 | 11/1993 | Reed | 250/227.16 |
| 5,305,405 | 4/1994 | Emmons et al. | 385/901 X |

*Primary Examiner*—John D. Lee
*Attorney, Agent, or Firm*—Robert M. Rodrick

[57] ABSTRACT

A traceable transmission conduit assembly includes an optically transmissive jacket over a transmission conduit. The conduit, which may be an optical fiber, includes a light transmissive and translucent jacket thereover. Light is injected into the jacket at one location therealong. The light is emitted along the length of the jacket so that the jacket illuminates. One conduit bundled among a group of similar conduits may be traced by so illuminating the jacket of the one conduit.

7 Claims, 3 Drawing Sheets

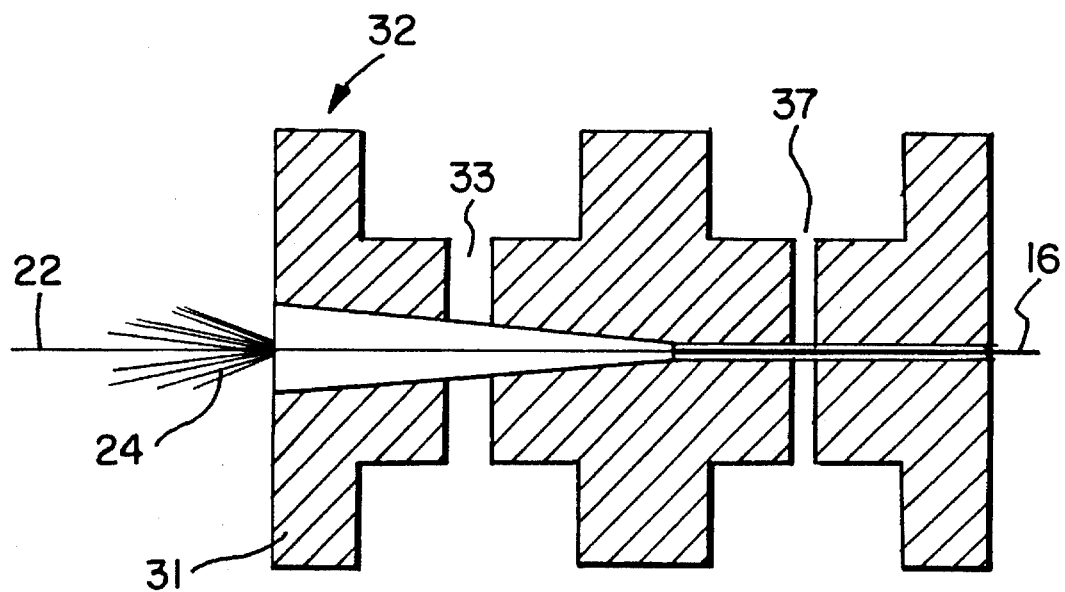
F I G. 5
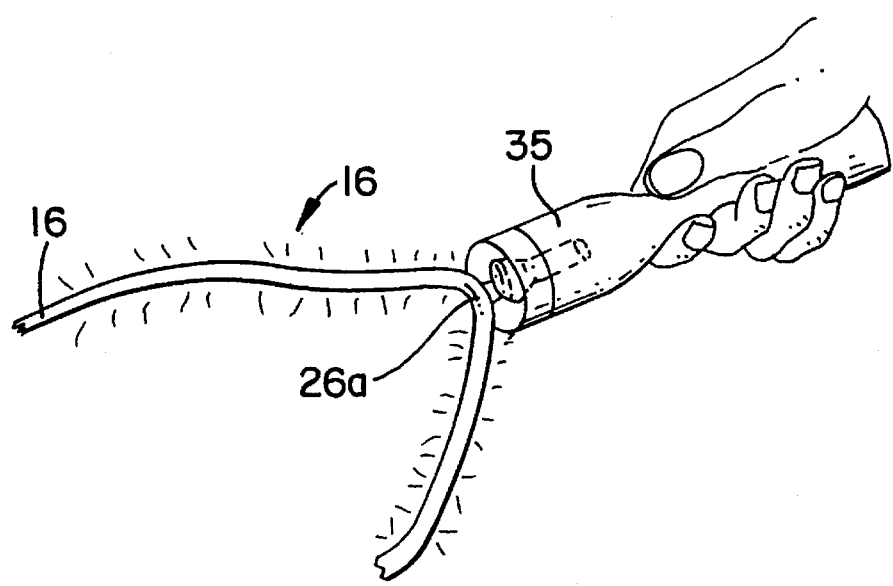
F I G. 6

LIGHT TRACEABLE TRANSMISSION CONDUIT ASSEMBLY

FIELD OF THE INVENTION

The present invention relates generally to a traceable transmission conduit such as, for example, an optical fiber or an electrical conductor. More particularly, the present invention relates to a traceable transmission conduit where a particular conduit may be easily identified and traced from among a plurality of similar conduits bundled together.

BACKGROUND OF THE INVENTION

In the transmission of communications signals two types of transmission devices are normally employed. One is an electrical conductor, typically copper and the other is an optical fiber, typically glass. Collectively these devices may be referred to as transmission conduits as they permit signals (either electrical or optical) to be transmitted along the length thereof. In either case, the fiber or conductor is encased in an outer insulative jacket thereby forming a cable. Each end of the cable may be terminated, preferably with an appropriate interconnection device (connector), to facilitate interconnection of cables. Optical and electrical interconnection of communication components (telephone, computers, etc.) using such cables is well known.

In transmitting communications signals such as voice and data, it is customary to use patch panels to effect multiple interconnections. Patch panels are devices having plural connection ports for accommodating the interconnection devices of cables. Connections between a patch panel and a communications component employ cables called line cords, while connections between patch panels employ cables called patch cords. Changes in the use of the system, such as changes in a telephone location or computer hardware, can be easily effected by changing the connections at the patch panel.

It can be readily appreciated that in certain densely populated situations, such as in a large office, there may be numerous cables attached to a single patch panel. Thus, it becomes important in making any change to a telephone or computer system that the proper cable be removed and reconnected. This process is usually referred to as cross-connections.

In order to provide fast and reliable cross-connections it becomes incumbent to properly identify each cable to reduce cross-connection time and installer error. Such error could result in significant down time to a computer or a telephone system. With densely populated patch panels, a simple cross-connection may become time consuming and subject to significant error. A technician must trace the cable through the system to the patch panel to assure proper cross-connection.

The prior art has seen attempts to provide proper cable identification to reduce the opportunity for installer error. These techniques include use of on-site record keeping to record the precise location of the equipment and the port on the patch panel to which it is connected. Also, conventional wire markers have been used at each end of the cable to identify remote locations thereof. Installers have even resorted to tugging on one end of the cable to locate the opposite end.

As may be appreciated, each of these techniques is either unreliable, time consuming or both. It is therefore desirable to provide a simpler, more reliable system to trace a given cable among a bundle of similarly disposed cables extending from a patch panel.

SUMMARY OF THE INVENTION

It is an object of the present invention to provide a readily identifiable transmission conduit which may be traced from among a bundle of similar transmission conduits.

It is a further object of the present invention to provide a transmission conduit having an optically transmissive jacket therearound which permits the easy identification of a single transmission conduit from among a bundle of similar conduits.

It is a still further object of the present invention to provide a method of more accurately and reliably identifying a single transmission conduit from among a bundle of similar conduits.

It is a yet further object of the present invention to provide a method of manufacturing a transmission conduit having a light transmissive jacket which permits the reliable identification of a single conduit from among a bundle of similar conduits.

In the efficient attainment of these and other objects, the present invention provides a conduit assembly including an elongate transmission conduit and an elongate light transmissive jacket therearound. The light transmissive jacket includes a first portion adapted to receive light injected through the jacket at a first portion and is further adapted to emit light at a second portion spaced from the first portion.

In a specific example shown by way of a preferred embodiment, the jacket is formed of optically translucent material which permits light to be injected into the jacket and wherein the jacket is illuminated by the injected light along the length thereof.

In a method aspect of the present invention a method of tracing a transmission conduit is provided. The method includes the steps of providing an elongate transmission conduit having a light transmissive jacket thereover. Light is then injected into one portion of the jacket. The injected light is then observed at a second portion of the jacket spaced from the one portion thereby providing traceable identification.

The method of manufacturing such a transmission conduit includes the steps of providing a transmission conduit and extruding light transmissive jacket over the conduit.

BRIEF DESCRIPTION OF THE DRAWINGS

FIG. 5 shows schematically, the method of manufacturing the fiber optic cable of FIG. 2.

FIG. 6 shows the fiber optic cable of FIG. 2 with light being injected into the jacket thereof.

DETAILED DESCRIPTION OF THE PREFERRED EMBODIMENTS

Figure 1:
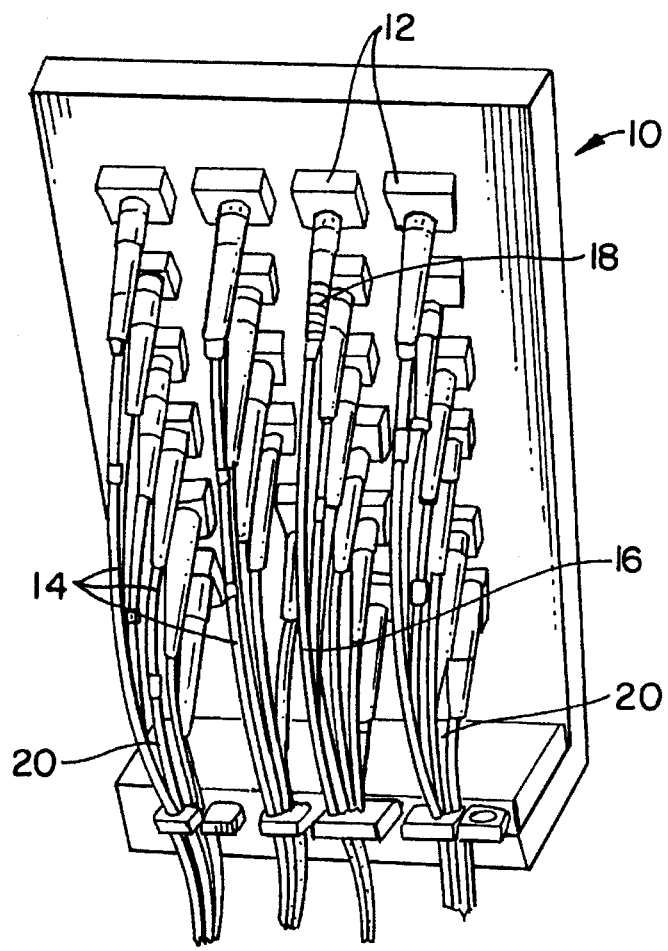
FIG. 1 is a perspective showing of a conventional patch panel having a plurality of terminated transmission conduits extending therefrom.

Referring to FIG. 1, a patch panel 10 is shown. Patch panel 10 is generally a flat, rectangular member having a plurality of connection ports 12 aligned in longitudinally extending horizontally spaced rows. Ports 12 permit the removable interconnection of terminated transmission conduits 14.

In the present illustrative embodiment, transmission conduit 14 is a fiber optic cable 16 terminated by a fiber optic connector 18. While the present invention shows fiber optic cable 16 terminated to patch panel 10, the present invention may be employed with other transmission conduits such as conventional copper electrical conductors which may be terminated by electrical connectors. In fact, it is contemplated that the present invention may be employed in combination with any transmission conduit, such as a fluid conduit, a vacuum hose or in any situation where identification of a particular conduit amongst a bundle of similar conduits is desired.

As can be seen from FIG. 1, a plurality of fiber optic cables 16 may extend from patch panel 10, The cables 16 are typically grouped in a number of bundles 20, each bundle constituting a plurality of cables 16. The cables may be run in bundles 20 or groups of bundles to the termination point remotely located from patch panel 10. The termination point could be either another patch panel (not shown) or communications components (not shown) to which the fiber optic cable 16 is connected. Such components could include computer hardware and/or telephone equipment. Thus, fiber optic cables 16 provide for signal transmission between remotely spaced components.

It may be appreciated from the depiction shown in FIG. 1, that it is often difficult to identify one of the fiber optic cables 16 from among the bundles of similar cables, especially in situations where it is necessary to identify a particular cable as being associated with a particular component located remotely therefrom.

Figure 2:
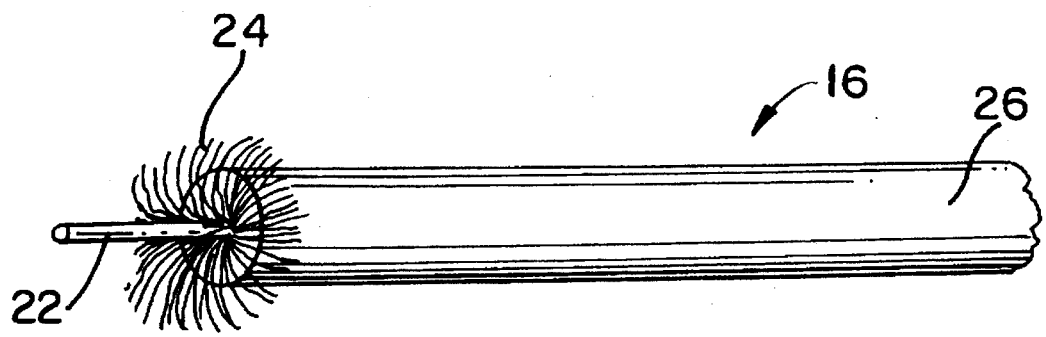
FIG. 2 shows a fiber optic cable construction of the present invention.
Figure 3:
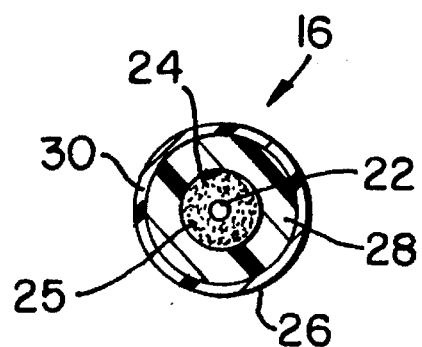
FIG. 3 is a transverse cross-section of the cable of FIG. 2.
Figure 4:
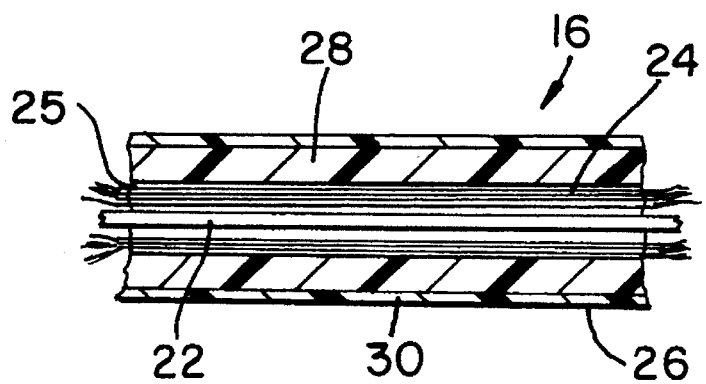
FIG. 4 is a longitudinal cross-section of the cable of FIG. 2.

Referring now to FIGS. 2–4, the present invention provides a fiber optic cable 16 having a jacket 26 formed of optically transmissive and translucent material so that the jacket can be externally illuminated thereby providing identification of a particular cable from among a group of similar cables.

Fiber optic cable 16 of the present invention includes a conventional centrally located elongate optical fiber 22. Fiber 22 is typically a glass fiber although the use of a plastic fiber is also contemplated. Glass fiber 22, as is well known in the fiber optic art, may include a central optically transmissive core and an optically transmissive cladding therearound. The fiber 22 may also include a protective buffer (not shown) thereover. Along and surrounding fiber 22 is a layer of fibrous strengthening members 24. Strengthening members 24 are formed of polyaramide fiber sold under the DuPont trademark KEVLAR. The strengthening members 24 add strength to the cable 16 and protect the fragile glass fiber 22. Extruded over fiber 22 and strengthening members 24 is a protective outer jacket 26, the construction of which will be described in further detail hereinbelow.

As shown in FIGS. 2–4, jacket 26 is loosely positioned around fiber 22 and strengthening members 24 so as to provide an air gap 25 therebetween. This is referred to as a loose tube construction. It is, however, contemplated that in a preferred form, the jacket 26 may be extruded tightly around strengthening members 24 and fiber 22 so that little or no air gap will exist therebetween. This is referred to as tight buffer construction. Jacket 26 is formed of a plastic material which is both optically transmissive (i.e. light may be propagated therealong) and optically translucent (i.e. light may be emitted or passed therethrough). As will be described in further detail hereinbelow, the optical material forming jacket 26 permits light to be directly injected into jacket 26 and transmitted and emitted continuously therealong so that the jacket will illuminate along its length permitting external visualization of the light by a technician. When so illuminated, one fiber optic cable 16 may be identified from among a bundle of similar cables which are not illuminated.

As shown in further detail in FIGS. 3 and 4, jacket 26 of fiber optic cable 16 includes an inner cylindrical jacket core 28 surrounded by an outer relatively thinner jacket cladding 30. In one example of a loose tube construction shown in FIGS. 3 and 4, jacket core 28 has a wall thickness of about 70 μm and jacket cladding has a wall thickness of about 10 μm. In a preferred tight buffer construction example, while the jacket cladding wall 30 thickness is the same, the jacket core 28 wall thickness is about 1 mm. The optically transmissive jacket core 28 is formed of extruded polymethyl-(methacrylate) (PMMA). This material is highly translucent if not transparent and also permits light which is injected into the jacket core to be propagated along the length of the jacket core in a manner described hereinbelow. Jacket cladding 30 is formed of extruded perfluorinated polymethyl-(methacrylate) (modified PMMA). As described further hereinbelow, modified PMMA has an index of refraction which is slightly lower than PMMA. Therefore, jack cladding 30 is slightly less optically transmissive than jacket core 28. However, jacket cladding 30 does permit injection and transmission of light therealong. Further it is contemplated that jacket 26 may be constructed to have a jacket cladding layer of modified PMMA both on the inside and the outside of the jacket core.

Referring to FIG. 5, the method of manufacturing a tight buffer fiber optic cable 16 of the present invention is schematically shown. Optical fiber having strengthening members 24 wrapped therearound is inserted between the dies 31 of a co-extrusion molding apparatus 32. As is well known in the co-extrusion art, inner jacket core 28 is formed by first extruding PMMA directly over the combination of fiber 22 and strengthening members 24 at a first location 33. In a second successive portion of the co-extrusion molding apparatus 32, modified PMMA is then extruded over the PMMA jacket core 28 at a second location 37 to form the cable 16 shown in FIGS. 2–4. While the co-extrusion technique shown in FIG. 5 may be preferably used, other techniques to form a fiber optic cable may also be employed in accordance with the present invention. In loose tube construction the jacket 26 may be extruded separately from the fiber 22.

In order to employ jacket 26 as a traceable element, the ability of the jacket 26 to propagate light as an auxiliary fiber optic device is briefly described.

As is well known in fiber optic technology, light may be transmitted along a fiber (in this case jacket 26 itself) by selecting the core and cladding of the jacket to have certain optical properties. The material forming the core of the optical device is selected to have an index of refraction which is greater than the material forming the cladding. Rays of light (sometimes called modes) injected into the core will strike the boundary between the core and cladding and due to the differences in the respective indexes of refraction will be reflected back into the core. Repeated reflection causes light rays to be propagated along the core.

However, due in part to the angle of incidence (injection) of the light, the relative indexes of refraction of the core and cladding and the condition of the boundary, some rays or modes of light will escape into the cladding at certain angles. Light will couple between the core/cladding boundary $b_1$ (FIG. 7) where the rays of light striking the boundary exceed the critical angle of the boundary. The critical angle $\theta_c$ is defined by the equation:

$$\text{SIN } \theta_c = \frac{N_2}{N_1} \text{ ; or}$$

$$\theta_c = \text{SIN}^{-1} \frac{N_2}{N_1}$$

Where $N_2$ is the refractive index of the cladding and $N_1$ is the refractive index of the core. The transfer or coupling of light between the core and cladding is enhanced significantly where the optical device is bent. This changes the angle at which the light strikes the core/cladding boundary causing additional rays to penetrate the core/cladding boundary. The rays of light which now escape into the cladding will also be propagated along the cladding in a similar manner. As the air surrounding the cladding has a low index of refraction some of the light in the cladding will be reflected back into the cladding, and some of the rays of light exceeding the critical angle of the cladding/air boundary $b_2$ (FIG. 7) will escape the cladding thereby illuminating the cable.

Figure 7:
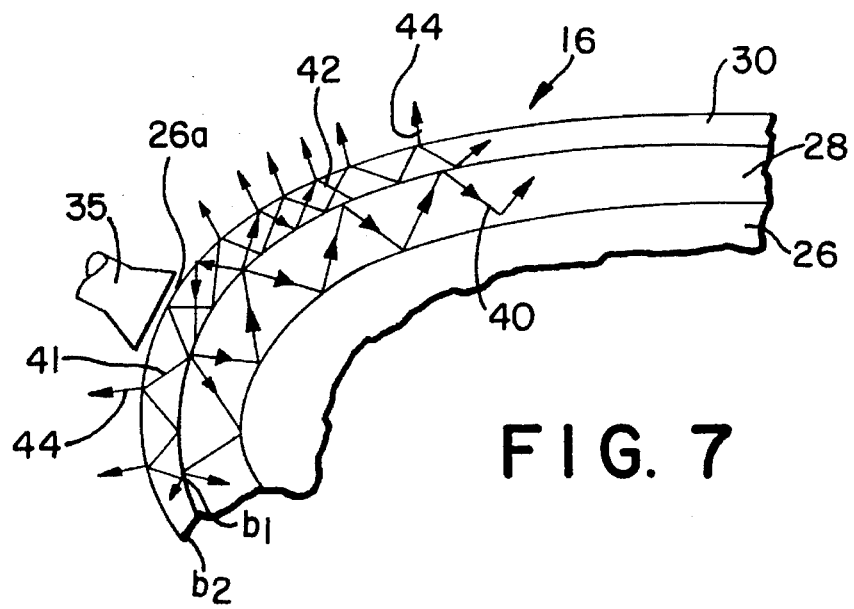
FIG. 7 is an enlarged schematic representation of a portion of the cable of FIG. 6, showing the transmission of light along the jacket thereof.

Referring specifically to FIGS. 6 and 7, the ability of jacket 26 to transmit light along its core 28 and emit light through cladding 30, also permits light to be injected into the core and cladding. If jacket 26 is bent, it will change the angle of incidence of the light rays striking both the core/cladding boundary as well as the boundary between the cladding and air. Changes in the angle of incidence of the light rays results in certain rays exceeding the critical angle at both the core/cladding boundary $b_1$, as well as at the cladding/air boundary $b_2$ (in the case of the cladding/air boundary, $N_2$=the index of refraction of air while $N_1$=the index of refraction of the cladding, in the above equation). These changes permit light to be injected into cladding 30 and through cladding 30 into core 28. Some rays of injected light will be propagated along core 28, some rays will be propagated along cladding 30 and some rays will escape the cladding 30 thereby illuminating jacket 26.

The coupling of light into or the escape of light from an optical device as a result of bending the device, is commonly referred to as macrobending and is well known in the optical fiber art. Examples of such are seen in U.S. Pat. No. 5,039,188 and U.S. Pat. No. 5,260,566.

Jacket 26 may be bent at an appropriate angle or bend radius to optimize injection of light. A mandrel or other apparatus (not shown) may be employed. A light source 35 such as a hand-held penlight or similar device may be placed against the jacket 26 at the location 26a of the bend to inject light thereinto.

As shown in further detail in FIG. 7 light transmission along jacket 26 may be described. Light is injected into jacket 26 at bend location 26a with light source 35. As above described, macrobending permits light emanating from outside of jacket 26 to be injected into jacket core 28. Light is then transmitted along the jacket core 28 in both directions in the manner described above. One mode or group of modes of such light is represented by rays 40. Rays 40 are transmitted along the length of jacket core 2S by bouncing between the core/cladding boundary $b_1$. Escaping light rays 42 (as well as some light rays 41 which are directly injected into cladding 30 by light source 35) will be transmitted along jacket cladding 30. However, much of the light transmitted along jacket 26, cladding 30 will escape exteriorly thereof as indicated by rays 44. These escaping light rays 44 will cause jacket to illuminate. Thus, as long as light source 35 is maintained adjacent the bent location 26a of jacket 26, light will be transmitted along jacket 26 in both directions and will be emitted therealong from jacket cladding 30.

It may be appreciated that a technician who is desirous of tracing the path of an individual fiber optic cable 16 may bend the cable at any intermediate location. The technician would then apply light source 35 to the bent location 26a causing light to be injected into jacket 26 and transmitted therealong. The escaping light from jacket 26 enables the technician to identify or trace the particular fiber optic cable along its entire length. This technique for tracing or identifying a particular fiber optic cable from among a bundle of similar cables is vastly superior to prior art practices. The present technique requires no previous identification in that there need be no wire markers placed on the cable prior to installation, nor is there a need for detailed records to be kept of the particular patching scheme. Further, as the light emanates from jacket 26 along its entire length it can be identified at any location therealong. Also, as the entire length of jacket 26 illuminates it provides an immediate visual indication of the location of the particular fiber among the bundle of fibers.

Various changes to the foregoing described and shown structures would now be evident to those skilled in the art. Accordingly, the particularly disclosed scope of the invention is set forth in the following claims.

What is claimed is:

1. A method of tracing a single transmission conduit among a bundle of similar transmission conduits, comprising the steps of:

providing an elongate transmission conduit having an elongate light transmissive jacket surrounding said conduit, said jacket including optical means for transmitting light along the length of said jacket and for emitting light exteriorly from the jacket along the length thereof;

bending said transmission conduit inclusive of said jacket at one portion thereof;

injecting light into said bent one portion of said jacket for transmission along the length of said jacket and for emission exteriorly from said jacket; and observing said emitted light at a location along said jacket spaced from said bent one portion thereof.

2. A method in accordance with claim 1 wherein said providing step includes providing said elongate transmission conduit with a light transmissive optically translucent jacket therearound.

3. A method in accordance with claim 2 wherein said observing step includes observing said emitted light along the length of said jacket.

4. A method in accordance with claim 3 wherein said jacket includes an optical core surrounded by an optical cladding.

5. A method in accordance with claim 4 wherein said jacket is flexible.

6. A method in accordance with claim 1, wherein said jacket includes an optical core surrounded by an optical cladding, and wherein said injecting step further includes injecting said light into the core of said jacket at said bent one portion through said cladding of said jacket.

7. A method in accordance with claim 6 wherein said transmission conduit is an optical fiber.

* * * * *